(12) United States Patent
Fan et al.

(10) Patent No.: US 11,116,247 B2
(45) Date of Patent: Sep. 14, 2021

(54) THREE-DIMENSIONAL PRINTER COUPLED WITH MICROWAVE AND PRINTING METHOD APPLIED FOR FOOD DESIGN

(71) Applicant: Jiangnan University, Wuxi (CN)

(72) Inventors: Daming Fan, Wuxi (CN); Zilong Zhao, Wuxi (CN); Liming Jin, Wuxi (CN); Bowen Yan, Wuxi (CN); Hao Zhang, Wuxi (CN); Wenhua Gao, Nanjing (CN); Hongwei Cao, Wuxi (CN); Huayu Yang, Wuxi (CN); Jianxin Zhao, Wuxi (CN); Wei Chen, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/114,943

(22) Filed: Dec. 8, 2020

(65) Prior Publication Data
US 2021/0112845 A1    Apr. 22, 2021

Related U.S. Application Data

(63) Continuation of application No. PCT/CN2019/088547, filed on May 27, 2019.

(30) Foreign Application Priority Data

Jan. 30, 2019    (CN) .......................... 201910089465.1

(51) Int. Cl.
| | |
|---|---|
| *A23P 20/20* | (2016.01) |
| *B33Y 10/00* | (2015.01) |
| *B33Y 30/00* | (2015.01) |
| *A23L 5/10* | (2016.01) |
| *A23P 20/25* | (2016.01) |

(52) U.S. Cl.
CPC ................. *A23P 20/20* (2016.08); *A23L 5/15* (2016.08); *B33Y 10/00* (2014.12); *B33Y 30/00* (2014.12); *A23P 2020/253* (2016.08); *A23V 2002/00* (2013.01)

(58) Field of Classification Search
CPC .... A23P 20/20; A23P 2020/253; B33Y 10/00; B33Y 30/00; A23L 5/15; A23V 2002/00
USPC ........................................................ 426/243
See application file for complete search history.

(56) References Cited

U.S. PATENT DOCUMENTS

2018/0020691 A1\*  1/2018  Aydin .................. A23G 3/0242
                                                                426/103

FOREIGN PATENT DOCUMENTS

| CN | 103235222 A | 8/2013 |
|---|---|---|
| CN | 204534709 U | 8/2015 |
| CN | 106235366 A | 12/2016 |

(Continued)

*Primary Examiner* — Dana Ross
*Assistant Examiner* — Joseph W Iskra
(74) *Attorney, Agent, or Firm* — IPro, PLLC

(57) ABSTRACT

The disclosure relates to a three-dimensional printer coupled with microwave and a printing method applied for food design. A microwave heating probe embedded in the inner wall of a barrel releases microwaves at the front end, and in combination with the setting of a vertical distance between the front end of the microwave heating probe and an extrusion nozzle, the effect of instant curing of an extruded material is realized. A cooling device is disposed so as to ensure that a material to be printed in the barrel is not cured by microwave heating before the material to be printed enters the extrusion nozzle.

13 Claims, 4 Drawing Sheets

(56) References Cited

FOREIGN PATENT DOCUMENTS

| | | | |
|---|---|---|---|
| CN | 206078819 | * | 4/2017 |
| CN | 107901403 | * | 4/2018 |
| CN | 107901403 | A | 4/2018 |
| CN | 108135245 | A | 6/2018 |
| CN | 208164299 | U | 11/2018 |
| CN | 109158535 | A | 1/2019 |
| JP | 2015217682 | A | 12/2015 |
| KR | 101526827 | B1 | 6/2015 |

* cited by examiner

THREE-DIMENSIONAL PRINTER COUPLED WITH MICROWAVE AND PRINTING METHOD APPLIED FOR FOOD DESIGN

TECHNICAL FIELD

The disclosure relates to a three-dimensional printer coupled with microwave and printing method applied for food design, and belongs to the technical field of food.

BACKGROUND 3D printing is a new manufacture mode which performs layered printing and layer-by-layer stacked printing according to instructions of a control system to manufacture parts. Compared with traditional manufacture methods, 3D printing has the characteristics of rapid manufacturing, wide application range and high accuracy. At present, 3D printing is mainly applied to the printing of temperature-sensitive materials such as chocolate and autonomously mixed paste in the food field, and a Fused Deposition Modeling (FDM) technology is mainly adopted. The FDM technology is configured to extrude fused or pasty food fluid out of a nozzle so as to be stacked and modeled on a platform. Because the fusing point of the chocolate is lower, the fused chocolate is cured and modeled immediately when encountering a printing platform of which the temperature is lower than the fusing point of the chocolate. Furthermore, the cured chocolate has higher mechanical strength, so that 3D printing of chocolate is also suitable for printing of unsupported three-dimensional structures.

Relatively speaking, flowing gelatinous foods, such as surimi, minced meat and flour paste, are mainly used as dinner plate decoration in the field of catering. Because the foods are not cured, the foods are not suitable for eating. For the 3D printing and processing technology of such materials, at present, a solution of printing first and then curing is mainly adopted. However, because the mechanical strength of the uncured food paste is relatively poor, it is easy to collapse during printing, and it is difficult to print a product with a better hollow and unsupported three-dimensional structure. Furthermore, in the stage of heating and curing of the printed food paste, deformation of the product is extremely easy to occur, thereby being difficult to meet the requirements of consumers for the product.

In order to overcome the dependence of 3D printing on temperature-sensitive materials and the phenomena of low mechanical strength, easy collapse and the like of hollow unsupported three-dimensional structures, and apply 3D printing to the flowing gelatinous foods, such as minced fillet, minced meat and rice and flour paste. Instant curing printing method has gradually attracted researchers' interest. A 3D printer for manufacturing pancakes, disclosed by Weifeng Ben (201720021832.0) as well as a pancake 3D printer and a heating device based on the pancake 3D printer, disclosed by Zheng Zhao (201620975303.X) (201620969406.5) adopt a mode of mounting a heating plate on a printing platform to realize simultaneous printing and curing of pancakes. However, a conductive heating mode is not suitable for three-dimensional structure products with a certain thickness or height. Furthermore, due to conductive heating, the material sprayed first is overheated, and the material sprayed later is not heated thoroughly, thereby resulting in uneven product curing.

Weirong Li (201711206387.6) disclosed a microwave heating mechanism for 3D printing. Microwaves are generated by a magnetron, the heating range of the microwaves is limited by upper and lower microwave shielding frames, and the extruded plastic and metal fused wires are heated to keep the material in a fused state for easy modeling. However, microwave transmission in the air is prone to scattering, refraction and dissipation, so it cannot ensure that the microwaves in a microwave fairing can pass through a microwave outlet ring at a constant volume to reach a printing cavity to realize uniform heating of a printed object. Furthermore, a microwave generator is not provided with a cooling device, so that it is easy to cause an overheating phenomenon and damage components.

Weimin Yang (201510235822.2) disclosed a microwave-sintered 3D printer. A microwave knife has a small diameter and a small microwave range. However, a medical microwave knife can withstand low power and temperature and has low heating speed, poor penetrability and short service life. Furthermore, the medical microwave knife does not have an anti-leakage device, microwaves are easy to leak and cause harm to the human body, and the microwaves gradually dissipate during transmission. So that the medical microwave knife is not suitable for microwave processing of foods. At the same time, because the material has a loss factor, the microwaves will attenuate when penetrating through the material. Therefore, the thickness of the material needs to be determined according to the microwave range of the microwave knife and the loss constant of the material, which makes it limited in 3D printing application in the food field.

Therefore, there is an urgent need to design a 3D printing method capable of performing 3D printing on flowing gelatinous foods, such as surimi, minced meat and flour paste. And free of limitation of factors, such as the thickness of the printed and modeled material or strong hollow three-dimensional structure, and a corresponding printer.

SUMMARY

In order to solve the existing problems of incomplete curing, easy collapse of printed products, difficulty in printing hollow three-dimensional structures, etc. during the 3D printing of flowing gelatinous foods such as surimi, minced meat and rice and flour paste, the disclosure provides a three-dimensional printer coupled with microwave and printing method applied for food design.

A first objective of the disclosure is to provide a three-dimensional printer coupled with microwave applied for food design. The three-dimensional printer includes a printing drive mechanism, a microwave heating unit, an anti-leakage unit, an extrusion unit, a control unit and a printing platform. The microwave heating unit includes a microwave heating probe; the extrusion unit includes a barrel, the barrel wall of the barrel is of a partially hollow structure, and the microwave heating probe is positioned in the hollow structure of the barrel wall.

The vertical distance between the front end of the microwave heating probe and an extrusion nozzle is determined according to the microwave reflection loss R(dB) of a material to be printed.

Optionally, the microwave heating probe includes a microwave transmission line, a cooling device, a stainless steel tube and an insulator. The stainless steel tube is disposed in the hollow structure of the barrel wall, the microwave transmission line and the cooling device are disposed in the stainless steel tube, and the insulator is positioned at the terminal of the microwave heating probe and seals the stainless steel tube.

Optionally, the microwave transmission line is a coaxial line.

Optionally, the barrel is provided with the extrusion nozzle, the port of the extrusion nozzle is provided with a non-absorbing material, and the size of the non-absorbing material, that is, the vertical distance between the front end of the microwave heating probe and the extrusion nozzle is determined according to the microwave reflection loss R(dB) of the material to be printed.

Optionally, the non-absorbing material is set to be of a shape of a circular ring and is sleeved on the extrusion nozzle.

Optionally, the non-absorbing material includes: polytetrafluoroethylene, glass, ceramics, PFA, quartz, PEEK, polysulfone, polyether sulfone, PPS, polypropylene (PP), polyethylene (PE), polycarbonate (PC), and glass fiber.

Optionally, the non-absorbing material is in the shape of a circular ring, and the size of the non-absorbing material is determined according to the microwave reflection loss R(dB) of the material to be printed, including: determining the vertical distance d between the front end of the microwave heating probe and the extrusion nozzle according to the microwave reflection loss R(dB) of the material to be printed.

The value of d is determined according to the following formula:

$$R(dB) = -20 \left| \frac{z_{in} - 1}{z_{in} + 1} \right|$$

$$z_{in} = \sqrt{\frac{\mu_0 \mu}{\varepsilon_0 \varepsilon}} \tanh_i \frac{\omega}{c} \sqrt{\varepsilon_0 \mu_0 \varepsilon \mu} d$$

At an assigned frequency, the absorbing effect of the material and its thickness are not in a simple linear relationship. When the absorption peak of a reflection loss R(dB) curve of the material is the smallest, the corresponding thickness is the optimal size, that is, the value of d is equal to the optimal absorption thickness of the reflection loss of the material.

$z_{in}$ is input impedance of the material to be printed; c is vacuum light velocity, c=3×10$^8$ m/s; ω=2πf, f is microwave frequency; $\mu_0$ is magnetic conductivity in a free space with the value of 4π×10$^{-7}$ H/m; μ is magnetic conductivity of the material to be printed; $\varepsilon_0$ is the dielectric constant in the free space with the value of 8.854×10$^{-12}$ F/m; and ε is the dielectric constant of the material.

Optionally, the cooling device includes a water inlet, a water outlet, a water inlet tube, a water outlet tube and a water inlet and outlet tee; one end of the microwave transmission line is connected with a microwave generation device through an adapter, and the other end of the microwave transmission line is connected into the insulator.

Optionally, the water inlet of the cooling device is connected with a coolant container through a peristaltic pump, and a coolant is pumped into the water inlet through the peristaltic pump, enters a gap formed by the stainless steel tube, the microwave transmission line and the insulator through the water inlet tube, and then flows back to the coolant container through the water outlet.

Optionally, a pump head of the peristaltic pump is a detachable pump head.

Optionally, the printer further includes the microwave generation device, and the microwave generation device includes a cooling fan and a microwave solid-state oscillator.

The anti-leakage unit includes a bell mouth at the front end of the barrel, a microwave absorption coating on the printing platform, and a choke groove in the front end of the barrel.

Optionally, the food three-dimensional printer further includes a bottom case, and the microwave generation device is positioned in the bottom case.

A second objective of the disclosure is to provide a food three-dimensional printing method. The method adopts the food three-dimensional printer and includes:

selecting a barrel with a non-absorbing material of a corresponding size according to the type of a material to be printed and mounting the barrel on the food three-dimensional printer;

setting microwave power of the food three-dimensional printer; and performing 3D printing on the material to be printed according to a printing model.

Optionally, selecting the barrel with the non-absorbing material of the corresponding size according to the type of the material to be printed and mounting the barrel on the food three-dimensional printer includes: determining the size of the non-absorbing material, that is, the value of the vertical distance d between the front end of the microwave heating probe and the extrusion nozzle, according to the following formula:

$$R(dB) = -20 \left| \frac{z_{in} - 1}{z_{in} + 1} \right|$$

$$z_{in} = \sqrt{\frac{\mu_0 \mu}{\varepsilon_0 \varepsilon}} \tanh_i \frac{\omega}{c} \sqrt{\varepsilon_0 \mu_0 \varepsilon \mu} d$$

At an assigned frequency, the absorbing effect of the material and its thickness are not in a simple linear relationship. When the absorption peak of a reflection loss R(dB) curve of the material is the smallest, the corresponding thickness is the optimal size, that is, the value of d is equal to the optimal absorption thickness of the reflection loss of the material.

$z_{in}$ is input impedance of the material to be printed; c is vacuum light velocity, c=3×10$^8$ m/s; ω=2πf, f is microwave frequency; $\mu_0$ is magnetic conductivity in a free space with the value of 4π×10$^{-7}$ H/m; μ is magnetic conductivity of the material to be printed; $\varepsilon_0$ is the dielectric constant in the free space with the value of 8.854×10$^{-12}$ F/m; and ε is the dielectric constant of the material to be printed.

A third objective of the disclosure is to provide application of the food three-dimensional printer and/or the food three-dimensional printing method in the technical field of food three-dimensional printing. The food includes flowing gelatinous food.

The disclosure has the following beneficial effects:

The food three-dimensional printer and printing method provided by the disclosure realize a continuous 3D printing technology of instant curing processing, and effectively avoid the dependence of a traditional 3D printer on temperature-sensitive materials. The microwave heating probe embedded in the inner wall of the barrel releases microwaves at the insulator of the front end, and the setting of the size of the non-absorbing material realize the effect of instant curing of the extruded material. Through the design of the bell mouth and the choke groove of the anti-leakage unit, and in combination with the design of the absorbing material of the printing platform, the heating efficiency of the product is effectively improved, and the microwave leakage and diffusion are prevented. The microwave solid-state oscillator and the coaxial line are configured to transmit microwaves, so that the microwave output is stable, the power and frequency can be adjusted according to printing needs. In addition the microwave solid-state source is small in volume and convenient to integrate. The food three-dimensional printer and printing method provided by the disclosure can quickly heat and cure the material extruded by the 3D printer, so that the product structure has high mechanical strength, the manufacture of a hollow unsupported three-dimensional structure can be realized, and the shape of the manufactured product is not easy to collapse.

BRIEF DESCRIPTION OF FIGURES

In order to illustrate the technical solutions more clearly in the examples of the disclosure, the drawings required for description of the examples will be briefly introduced below. It is apparent that the drawings in the following description are only some examples of the disclosure. Those skilled in the art can also obtain other drawings according to these drawings without any creative work.

FIG. 1 to FIG. 5 include printing drive and installation mechanisms, such as an X-axis guide rod 1, a Z-axis guide rod 2, a Y-axis guide rod 3, a printing platform 4, a barrel 5, a lead screw stepping motor 6, and a fixed seat 7. As shown in FIG. 1, FIG. 2 and FIG. 3, the 3D printer includes a microwave heating unit, an anti-leakage unit, an extrusion unit and a control unit. The microwave heating unit includes a microwave solid-state source 8, a microwave heating probe 9, a microwave heating probe water inlet 10, a microwave heating probe water outlet 11, a water inlet and outlet tee 12, a water inlet tube 13, a stainless steel tube 14, a transmission cable 15, an insulator 16, a water outlet tube 17, a microwave heating probe adapter 18, a peristaltic pump 19 and a pump head 20. The anti-leakage unit includes a bell mouth 21, a rubber flat absorbing material 22, a choke groove 23 and a heat dissipation fan 24. The extrusion unit includes a barrel wall 25, an extrusion nozzle 26 and a non-absorbing material 27. The control unit includes a touch screen 28, a main switch 29, a microwave power adjusting knob 30, a peristaltic pump flow velocity adjusting knob 31 and an integrated circuit 32.

DETAILED DESCRIPTION

In order to make the objectives, technical solutions and advantages of the disclosure more clear, the examples of the disclosure will be further described in detail below with reference to the drawings.

Example 1

Figure 1:
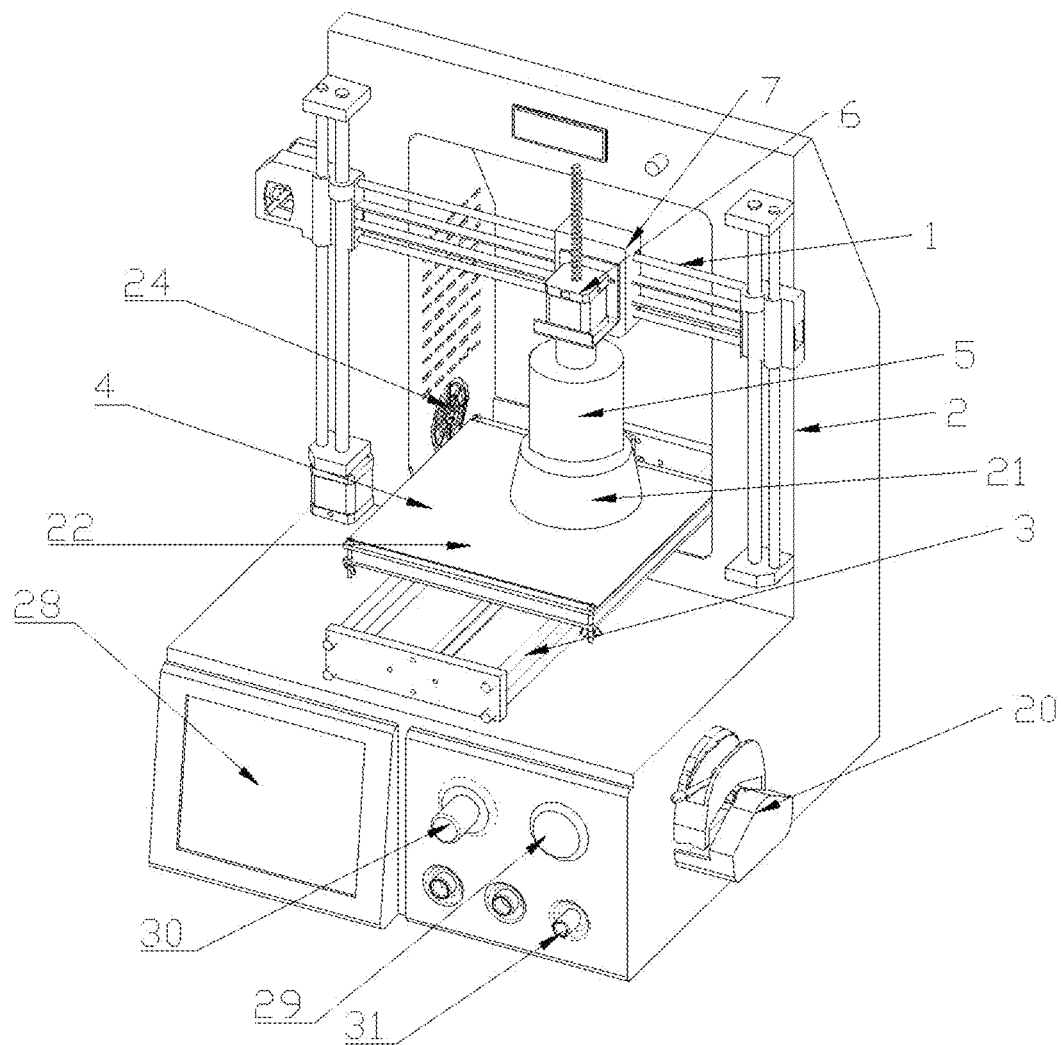
FIG. 1 is a three-dimensional schematic diagram of appearance of the disclosure.

The present example provides a food three-dimensional printer. Referring to FIG. 1, the food three-dimensional printer includes a printing drive mechanism, a microwave heating unit, an anti-leakage unit, an extrusion unit, a control unit and a printing platform. The microwave heating unit includes a microwave solid-state source and a microwave heating probe; the extrusion unit includes a barrel, the barrel wall of the barrel is of a partially hollow structure, and the microwave heating probe is positioned in the hollow structure of the barrel wall; and the vertical distance between the front end of the microwave heating probe and an extrusion nozzle is determined according to the microwave reflection loss R(dB) of a material to be printed.

The food three-dimensional (3D) printer is designed on the basis of a 3D printer provided with a printing drive mechanism, and includes printing drive and installation mechanisms, such as a peripheral stainless steel frame material, an X-axis guide rod 1, a Z-axis guide rod 2, a Y-axis guide rod 3, a printing platform 4, a barrel 5, a lead screw stepping motor 6 and a fixed seat 7.

Figure 2:
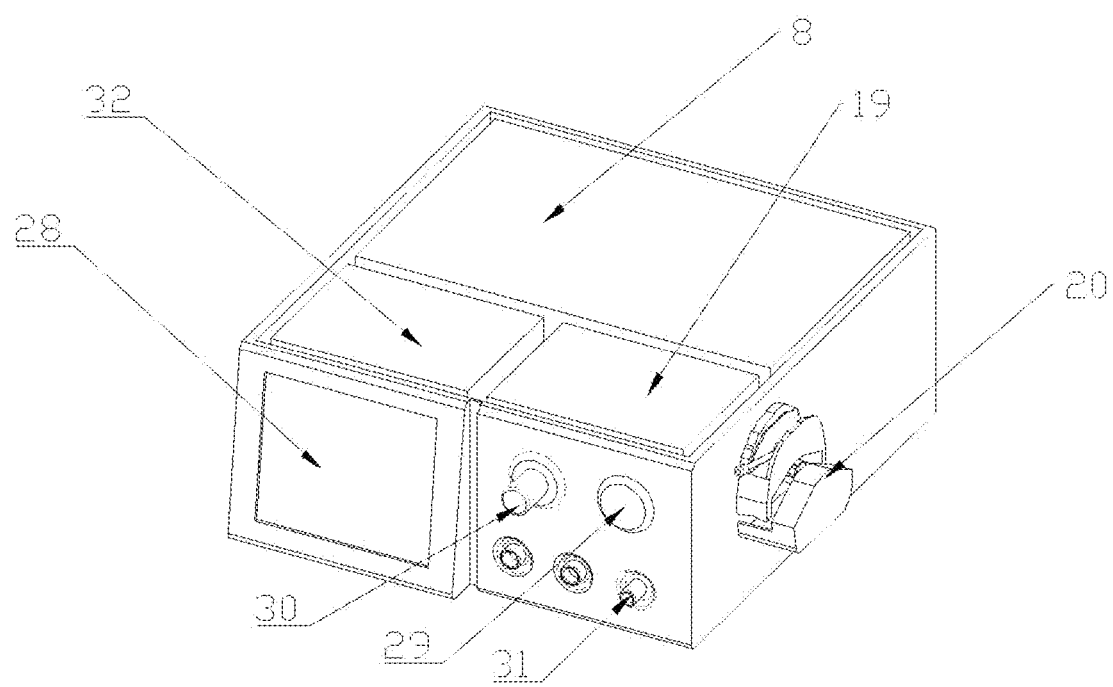
FIG. 2 is a cross-sectional diagram of a case of the disclosure.
Figure 3:
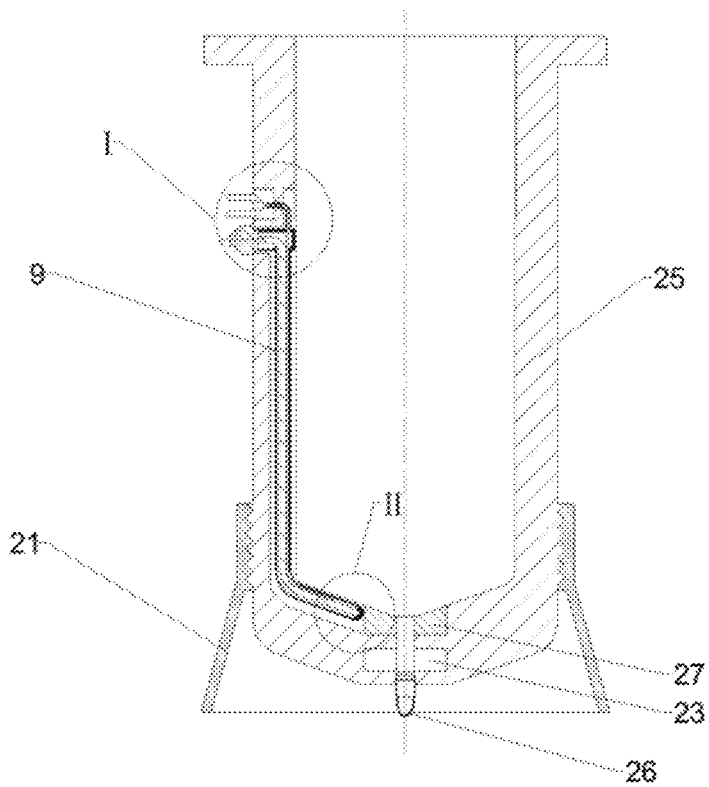
FIG. 3 is a schematic diagram of a cross-sectional structure of a barrel of the disclosure, wherein I is a schematic structure diagram of a tail of a microwave heating probe, and II is a schematic structure diagram of an output end of the microwave heating probe.

As shown in FIG. 1, FIG. 2 and FIG. 3, The microwave heating unit of the 3D printer includes a microwave solid-state source 8, a microwave heating probe 9, a microwave heating probe water inlet 10, a microwave heating probe water outlet 11, a water inlet and outlet tee 12, a water inlet tube 13, a stainless steel tube 14, a transmission cable 15, an insulator 16, a water outlet tube 17, a microwave heating probe adapter 18, a peristaltic pump 19 and a pump head 20. The anti-leakage unit includes a bell mouth 21, a rubber flat absorbing material 22, a choke groove 23 and a heat dissipation fan 24. The extrusion unit includes a barrel wall 25, an extrusion nozzle 26 and a non-absorbing material 27. The control unit includes a touch screen 28, a main switch 29, a microwave power adjusting knob 30, a peristaltic pump flow velocity adjusting knob 31 and an integrated circuit 32.

As shown in FIG. 3, the barrel wall 25 of the barrel 5 of the extrusion unit has a partially hollow structure, the microwave heating probe 9 of the microwave heating unit is embedded in the barrel wall 25, and the barrel 5 contains a material to be printed. In a printing process, the material to be printed is ejected from the extrusion nozzle 26 by the pushing of the lead screw stepping motor 6, and the vertical distance between the front end of the microwave heating probe 9 and the extrusion nozzle 26 is determined according to the microwave reflection loss R(dB) of the material to be printed. In order to achieve better heating effects, the non-absorbing material 27 is disposed at the inner layer of the extrusion nozzle 26 close to the barrel 5 in the present example, the size of the non-absorbing material 27 is determined according to the vertical distance between the front end of the microwave heating probe 9 and the extrusion nozzle 26, and the extrusion nozzle 26 is in a shape of a circular tube. When the material to be printed enters the extrusion nozzle 26, microwaves heat and cure the material to be printed through the non-absorbing material 27 in a shape of a circular ring. In order to ensure complete and uniform curing of the material to be printed, firstly, the vertical distance between the front end of the microwave heating probe 9 and the extrusion nozzle 26 is determined according to the material to be printed, that is, different sizes of non-absorbing materials 27 are selected for different materials to be printed. Specifically:

(1) firstly, the dielectric constant $\varepsilon$ and the magnetic conductivity $\mu$ of the material to be printed are measured.

$$z_{in} = \sqrt{\frac{\mu_0 \mu}{\varepsilon_0 \varepsilon}} \tanh_i \frac{\omega}{c} \sqrt{\varepsilon_0 u_0 \varepsilon \mu} d$$

The measured dielectric constant ε and magnetic conductivity μ of the material to be printed are substituted into the above formula to calculate the input impedance $z_{in}$ of the material to be printed. In the above formula, $z_{in}$ is input impedance of the material to be measured; c is vacuum light velocity, $c=3\times10^8$ m/s; $\omega=2\pi f$, f is microwave frequency; $\mu_0$ is magnetic conductivity in a free space with the value of $4\pi\times10^{-7}$ H/m; μ is magnetic conductivity of the material to be printed; $\varepsilon_0$ is the dielectric constant in the free space with the value of $8.854\times10^{-12}$ F/m; and ε is the dielectric constant of the material to be printed.

(2) In combination with the following formula:

$$R(dB) = -20 \left| \frac{z_{in} - 1}{z_{in} + 1} \right|$$

At an assigned frequency, the absorbing effect of the material and its thickness are not in a simple linear relationship. When the absorption peak of the reflection loss R(dB) curve of the material is the smallest, the corresponding thickness is the optimal size which is generally less than −10 dB, and the size of the non-absorbing material 27 corresponding to the material to be printed is obtained, that is, the vertical distance d between the front end of the microwave heating probe 9 and the extrusion nozzle 26.

Therefore, it can be ensured that the material to be printed is completely and uniformly cured when the material to be printed is extruded by the extrusion nozzle 26.

In practical application, the non-absorbing material 27 may be designed into a shape of a circular ring to be sleeved on the extrusion nozzle 26. The nozzle 26 may be of a shape of a circular tube or other tube shapes, such as a rectangular hollow tube. The extruded material is flat, and the thickness can be set at will. The disclosure is not limited thereto. In practical application, corresponding tube shapes are selected according to needs.

The non-absorbing material includes: polytetrafluoroethylene, glass, ceramics, PFA, quartz, PEEK, polysulfone, polyether sulfone, PPS, polypropylene (PP), polyethylene (PE), polycarbonate (PC), and glass fiber.

In the following example, the non-absorbing material 27 is described by using a polytetrafluoroethylene material ring as an example.

At the same time, in order to ensure that the material to be printed in the barrel 5 is not cured by microwave heating before the material to be printed enters the extrusion nozzle 26, a cooling device needs to be disposed in the microwave heating probe 9. The cooling device includes the water inlet tube 13 and the water outlet tube 17, and the cooling device and the microwave transmission cable 15 are fixed in the stainless steel tube 14 in parallel. Correspondingly, the enlarged diagram of the schematic structure diagram I in FIG. 3 (that is, FIG. 4) shows the microwave heating probe water inlet 10, the microwave heating probe water outlet 11 and the water inlet and outlet tee 12. The microwave heating probe water inlet 10 is connected with the water inlet tube 13, and the microwave heating probe water outlet 11 is connected with the water outlet tube 17. Cooling water is pumped out from the coolant container through the pump head 20, enters the water inlet and outlet tee 12 through the microwave heating probe water inlet 10, continues to flow through the water inlet tube 13, and enters the stainless steel tube 14 to play a cooling role; and the cooling water enters the water inlet and outlet tee 12 through the water outlet tube 17, is discharged from the microwave heating probe water outlet 11, and then flows back to the coolant container, thereby completing a cooling function. The coolant container is not shown in the drawings of the disclosure, and can be set at an appropriate position according to needs in practical application.

The schematic diagram of the output end of the microwave heating probe in the enlarged diagram of the schematic structure diagram II in FIG. 3 (that is, FIG. 5) shows the connection of the output end of the microwave heating probe with the insulator 16 and the relative position of the microwave heating probe 9 and the non-absorbing material 27.

Figure 4:
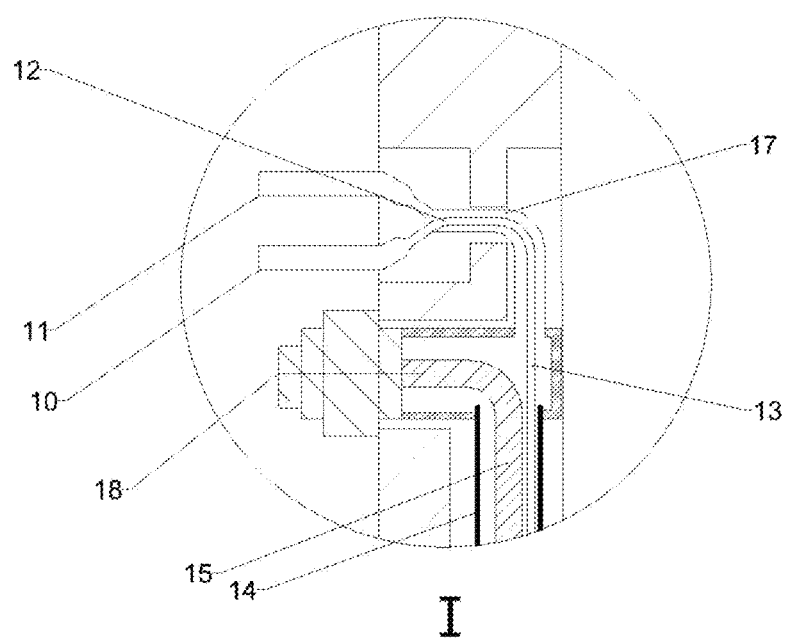
FIG. 4 is an enlarged diagram of the schematic structure diagram I of the tail of the microwave heating probe.
Figure 5:
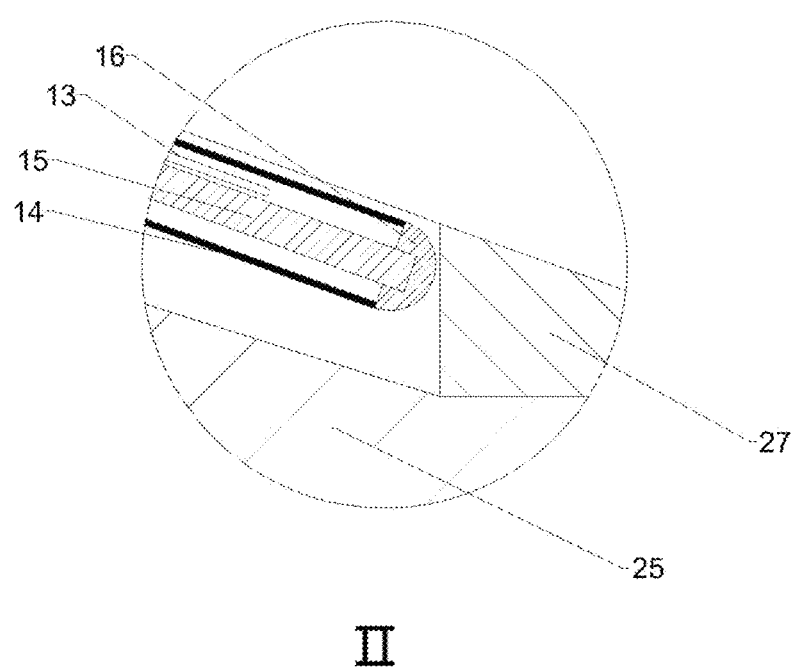
FIG. 5 is an enlarged diagram of the schematic structure diagram II of the output end of the microwave heating probe.

As shown in FIG. 3, FIG. 4 and FIG. 5, the microwave heating probe 9 is fixed in a cavity inside the barrel wall, one end of the insulator 16 of the microwave heating probe 9 is close to the extrusion nozzle 26, and one end of the microwave heating probe adapter 18 is close to one end of the fixed seat 7 and is fixed on the barrel wall 25 through an opening in the barrel wall 25.

As shown in FIG. 2, FIG. 3, FIG. 4 and FIG. 5, in a 3D printer suitable for continuous instant curing processing of flowing food of the disclosure, the microwave heating probe 9 includes the microwave heating probe water inlet 10, the microwave heating probe water outlet 11, the water inlet and outlet tee 12, the water inlet tube 13, the stainless steel tube 14, the transmission cable 15, the insulator 16, the water outlet tube 17 and the microwave heating probe adapter 18. The inside of the stainless steel tube 14 is of a hollow structure and is provided with the microwave transmission cable 15. One end of the stainless steel tube 14 is connected with the microwave heating probe adapter 18. A microwave heating probe connector includes the microwave heating probe adapter 18, the microwave heating probe water inlet 10, the microwave heating probe water outlet 11 and the water inlet and outlet tee 12. One end of the microwave transmission cable 15 close to the microwave heating probe connector is connected with the microwave heating probe adapter 18, and the other end of the microwave transmission cable 15 is positioned at the open end of the stainless steel tube 14 and is connected with the matched insulator 16.

As shown in FIG. 5, the microwave transmission cable 15 extends into the insulator 16, one end of the water inlet tube 13 is connected with the microwave heating probe water inlet 10, and the other end of the water inlet tube 13 enters the stainless steel tube 14. The water outlet tube 17 is connected with the microwave heating probe water outlet 11. The cooling water enters the water inlet and outlet tee 12 through the microwave heating probe water inlet 10, the cooling water enters the stainless steel tube 14 through the water inlet tube 13 to play a cooling role, and the cooling water enters the water inlet and outlet tee 12 through the water outlet tube 17 and is discharged from the microwave heating probe water outlet 11.

The microwave heating probe water inlet 10 is connected with a cooling water tank through the pump head 20, the microwave heating probe water inlet 10 and a guide tube interface are matched and are convenient to dismount and mount, and the cooling water outlet 11 is connected with the cooling water tank through a guide tube.

The insulator 16 is made of an insulating material with good toughness, low loss, high dielectric constant and high temperature resistance, the microwave heating probe water inlet 10, the microwave heating probe water outlet 11 and the water inlet and outlet tee 12 are made of stainless steel to prevent microwave leakage and have good durability, and the stainless steel tube 14 does not absorb or transmit microwaves to ensure that the microwaves can be transmitted to the insulator 16 of the microwave heating probe 9 along the microwave transmission cable 15 to release the microwaves.

The microwaves are generated by the microwave solid-state oscillator 8 and transmitted to the microwave heating probe 9 along the transmission cable.

Compared with a traditional magnetron, the microwave solid-state oscillator 8 has the characteristics of adjustable output power, phase and frequency, high frequency stability, small size, compactness and easy integration, and can withstand 100% reflection power.

External threads at the top of the barrel 5 are matched with internal threads of the fixed seat 7 so as to facilitate mounting and dismounting.

The outer diameter of the polytetrafluoroethylene material ring 27 is determined according to the microwave absorption capability of the material under a microwave field, so as to ensure that the material receives the microwave energy uniformly during the extrusion process in the extrusion nozzle. In the field of material science, the research on the absorbing properties of materials based on the transmission line theory is generally accepted by many scholars. The input impedance of a material layer can be calculated according to the transmission line theory:

$$z_{in} = \sqrt{\frac{\mu_0 \mu}{\varepsilon_0 \varepsilon}} \tanh_i \frac{\omega}{c} \sqrt{\varepsilon_0 \mu_0 \varepsilon \mu} d$$

$\mu_0$ is magnetic conductivity in a free space with the value of $4\pi \times 10^{-7}$ H/m; $\mu$ is magnetic conductivity of the material; $\varepsilon_0$ is the dielectric constant in the free space with the value of $8.854 \times 10^{-12}$ F/m; $\varepsilon$ is the dielectric constant of the material; c is vacuum light velocity with the value of $3 \times 10^8$ m/s; $\omega = 2\pi f$, and f is frequency; d is the optimal absorption thickness; and the reflection loss R(dB) of the material layer is expressed as:

$$R(dB) = -20 \left| \frac{z_{in} - 1}{z_{in} + 1} \right|$$

The absorbing effect of the material and its thickness are not in a simple linear relationship. At high moisture content, the absorbing characteristics of the material are highly consistent, and there is an optimal thickness at the assigned frequency.

The polytetrafluoroethylene material ring 27 is fixed between the tail end of the extrusion nozzle 26 of the barrel 5 and the microwave heating probe 9, and is capable of transmitting microwaves and causing almost no loss to the microwaves, thereby achieving efficient utilization of the microwaves.

The choke groove 23 is designed in the front end of the extrusion nozzle 26, and the choke groove 23, the bell mouth 21 and the rubber flat absorbing material 22 jointly form a microwave anti-leakage unit. The heat dissipation fan 24 can reduce the temperature of the rubber flat absorbing material 22 to prevent heat damage.

The extrusion end of the barrel 5 is connected with the bell mouth 21 through threads, and the opening diameter of the bell mouth is 0.8 wavelength. This design meets the requirements of traditional waveguide heaters and can effectively prevent microwave leakage.

As shown in FIG. 2, the case internally includes the control unit, the microwave solid-state source 8 and the peristaltic pump 19. The power of the microwave solid-state source 8 is adjusted and controlled by the control unit, the flow velocity of the peristaltic pump 19 is controlled by the control unit, and the power and flow velocity can be changed according to different processing requirements.

Example 2

The present example provides a food three-dimensional printing method. The method adopts the food three-dimensional printer provided by the Example 1. The method includes:

a barrel with a non-absorbing material of a corresponding size is selected according to the type of a material to be printed, and the barrel is mounted on the food three-dimensional printer.

Specifically: (1) firstly, the dielectric constant $\varepsilon$ and the magnetic conductivity $\mu$ of the material to be printed are measured.

$$z_{in} = \sqrt{\frac{\mu_0 \mu}{\varepsilon_0 \varepsilon}} \tanh_i \frac{\omega}{c} \sqrt{\varepsilon_0 \mu_0 \varepsilon \mu} d$$

The dielectric constant $\varepsilon$ and the magnetic conductivity $\mu$ of the material to be printed are substituted into the above formula to calculate the input impedance $z_{in}$ of the material to be printed. In the formula, $z_{in}$ is input impedance of the material; c is vacuum light velocity, $c = 3 \times 10^8$ m/s; $\omega = 2\pi f$, f is microwave frequency; $\mu_0$ is magnetic conductivity in a free space with the value of $4\pi \times 10^{-7}$ H/m; $\mu$ is magnetic conductivity of the material; $\varepsilon_0$ is the dielectric constant in the free space with the value of $8.854 \times 10^{-12}$ F/m; and $\varepsilon$ is the dielectric constant of the material.

(2) In combination with the following formula:

$$R(dB) = -20 \left| \frac{z_{in} - 1}{z_{in} + 1} \right|$$

At an assigned frequency, the absorbing effect of the material and its thickness are not in a simple linear relationship. When the absorption peak of the reflection loss R(dB) curve of the material is the smallest, the corresponding thickness is the optimal size, that is, a vertical distance d between the front end of the microwave heating probe 9 and the extrusion nozzle 26, namely, the outer diameter of the non-absorbing material 27.

The non-absorbing material 27 of the size d can be selected to ensure that the material to be printed is completely and uniformly cured when the material to be printed is extruded by the extrusion nozzle 26. After the selection, the barrel 5 with the non-absorbing material 27 of the size can be fixed on the fixed seat 7 by screwing.

The microwave power of the food three-dimensional printer is set; the microwave output power of the printer is selected through the microwave power adjusting knob 30 of the printer; and 3D printing is performed on the material to be printed according to a printing model.

The flow rate of the coolant can be changed through the peristaltic pump flow velocity adjusting knob 31, so as to ensure that the material to be printed in the inner layer of the barrel 5 is not cured before being squeezed into the extrusion nozzle 26.

The microwave solid-state oscillator 8 is connected with the microwave heating probe adapter 18 through the transmission cable. One end of the guide tube connected with the pump head 20 is connected to the coolant container. The coolant flows into the microwave heating probe water inlet 10 through the other end of the guide tube connected with the pump head 20 and reaches the water inlet tube 13 through the water inlet and outlet tee 12, enters the gap formed by the stainless steel tube 14, the microwave transmission cable 15 and the insulator 16 through the water inlet tube 13, and then passes through the water outlet tube 17 and reaches the guide tube through the microwave heating probe water outlet 11 so as to enter the coolant container.

In practical application, the coolant may be cooling water or any other liquid capable of playing a cooling role. The example of the disclosure is described by using cooling water as an example.

It may also be necessary to perform leakage detecting on a cooling water passage before printing. If water leakage occurs, the cooling water passage is checked to solve the problem of water leakage.

If there is no water leakage, Start Print is clicked on a touch screen 28 to enter a printing program.

In a printing process, the microwave solid-state oscillator 8 generates microwaves, the microwaves are transmitted to the microwave heating probe 9 to heat the material, and the microwaves emitted by the microwave heating probe 9 pass through the non-absorbing material 27 and enter the extrusion nozzle 26 to heat the extruded material. Because the extrusion speed of the material is constant, the time for the material to be heated through the extrusion nozzle 26 is the same, and the purpose of uniformly heating the material is achieved.

The material is heated and cured in the extrusion nozzle 26, then reaches the printing platform 4, and is stacked and formed on the printing platform 4 layer by layer.

At the height of the first layer of the extrusion nozzle 26, the Z axis remains unchanged, and the X axis and the Y axis move according to programs. The extruded material is pushed by a lead screw connected with the lead screw stepping motor 6, and the extruded material is heated and cured by the microwave heating probe 9 and extruded through the extrusion nozzle 26 and then reaches the printing platform 4.

After one layer of material is printed, the barrel 5 rises for one height along the Z axis for next printing. Because the microwave heating probe 9 is fixed on the barrel 5, the heating probe 9 also rises for one height to heat the next layer of extruded material.

After all layers are printed, each component returns to its original point, and a printed product is taken out.

The food three-dimensional printer and printing method provided by the disclosure realize a continuous 3D printing technology of instant curing processing, and effectively avoid the dependence of a traditional 3D printer on temperature-sensitive materials. The microwave heating probe embedded in the barrel wall releases microwaves at the front end, and in combination with the setting of the vertical distance between the front end of the microwave heating probe and the extrusion nozzle, that is, the setting of the size of the non-absorbing material, the effect of instant curing of the extruded material is realized. Through the design of the bell mouth and the choke groove of the anti-leakage unit, and in combination with the design of the absorbing material of the printing platform, the heating efficiency of the product is effectively improved, and microwave leakage and diffusion are prevented. The microwave solid-state oscillator and the coaxial line are configured to transmit microwaves, so that the microwave output is stable, the power and frequency can be adjusted according to printing needs, and the microwave solid-state source is small in volume and convenient to integrate. The cooling device is disposed in the microwave heating probe so as to ensure that the material to be printed in the barrel is not cured by microwave heating before the material to be printed enters the extrusion nozzle. The food three-dimensional printer and printing method provided by the disclosure can quickly heat and cure the material extruded by the 3D printer, so that the product structure has high mechanical strength, the manufacture of a hollow unsupported three-dimensional structure can be realized, and the shape of the manufactured product is not easy to collapse.

Some steps in the examples of the disclosure may be implemented by software, and corresponding software programs may be stored in a readable storage medium, such as an optical disk or a hard disk.

What is claimed is:

1. A food microwave three-dimensional printer, comprising a microwave heating unit, an extrusion unit, and a control unit, wherein the microwave heating unit comprises a microwave solid-state source and a microwave heating probe; the extrusion unit comprises a barrel, a barrel wall of the barrel is of a partial hollow structure, and the microwave heating probe is positioned in the hollow structure of the barrel wall;

the microwave heating probe comprises a microwave transmission line, a cooling device, a stainless steel tube and an insulator, wherein the stainless steel tube is disposed in the hollow structure of the barrel wall, the microwave transmission line and the cooling device are disposed in the stainless steel tube, and the insulator is positioned at the terminal of the microwave heating probe and seals the stainless steel tube;

the barrel is provided with an extrusion nozzle, a port of the extrusion nozzle is provided with a non-absorbing material, and the size of the non-absorbing material, that is, a vertical distanced between a front end of the microwave heating probe and the extrusion nozzle, wherein the vertical distanced is determined according to the microwave reflection loss R(dB) of a material to be printed based on the following formulas:

$$R(dB) = -20 \left| \frac{z_{in} - 1}{z_{in} + 1} \right|, \text{ and}$$

$$z_{in} = \sqrt{\frac{\mu_0 \mu}{\varepsilon_0 \varepsilon}} \tanh i \frac{\omega}{c} \sqrt{\varepsilon_0 \mu_0 \varepsilon \mu} d,$$

wherein when the absorption peak of a reflection loss R(dB) curve of the material is the smallest, the corresponding material thickness value is the value of d; $z_{in}$ is input impedance of the material to be printed; c is vacuum light velocity, and $c=3\times10^8$ m/s; $\omega=2\pi f$, f is microwave frequency, $\mu_0$ is magnetic conductivity in a free space with the value of $4\pi\times10^{-7}$ H/m; $\mu$ is magnetic conductivity of the material to be printed; $\varepsilon_0$ is the dielectric constant in the free space with the value of $8.854\times10^{-12}$ F/m; and $\varepsilon$ is the dielectric constant of the material.

2. The printer according to claim 1, wherein the non-absorbing material comprises: polytetrafluoroethylene, glass, ceramics, PFA, quartz, PEEK, polysulfone, polyether sulfone, PPS, polypropylene (PP), polyethylene (PE), polycarbonate (PC) and glass fiber.

3. The printer according to claim 1, wherein the cooling device comprises a water inlet, a water outlet, a water inlet tube, a water outlet tube and a water inlet and outlet tee; one end of the microwave transmission line is connected with a microwave generation device through an adapter, and the other end of the microwave transmission line is connected into the insulator.

4. The printer according to claim 3, wherein the water inlet of the cooling device is connected with a coolant container through a peristaltic pump, and a coolant is pumped into the water inlet through the peristaltic pump, enters a gap formed by the stainless steel tube, the microwave transmission line and the insulator through the water inlet tube, and then flows back to the coolant container through the water outlet.

5. The printer according to claim 4, wherein a pump head of the peristaltic pump is a detachable pump head.

6. The printer according to claim 5, wherein the printer further comprises a printing platform, the microwave generation device, and the microwave generation device comprises a cooling fan and a microwave solid-state oscillator; and
wherein the printer further comprises an anti-leakage unit that comprises a bell mouth at a front end of the barrel, a microwave absorption coating on the printing platform, and a choke groove in the front end of the barrel.

7. The printer according to claim 1, wherein the printer is configured to print flowing gelatinous food.

8. The printer according to claim 1, further comprising:
a printing platform, and
an anti-leakage unit that comprises a bell mouth at a front end of the barrel, a microwave absorption coating on the printing platform, and a choke groove in the front end of the barrel.

9. The printer according to claim 1, wherein the food three-dimensional printer further comprises a bottom case, and a microwave generation device is positioned in the bottom case.

10. A method of using a food three-dimensional printer, the printer including a microwave heating unit, an extrusion unit, and a control unit, wherein the microwave heating unit comprises a microwave solid-state source and a microwave heating probe; the extrusion unit comprises a barrel, a barrel wall of the barrel is of a partial hollow structure, and the microwave heating probe is positioned in the hollow structure of the barrel wall; the microwave heating probe comprises a microwave transmission line, a cooling device, a stainless steel tube and an insulator, wherein the stainless steel tube is disposed in the hollow structure of the barrel wall, the microwave transmission line and the cooling device are disposed in the stainless steel tube, and the insulator is positioned at the terminal of the microwave heating probe and seals the stainless steel tube; the barrel is provided with an extrusion nozzle, a port of the extrusion nozzle is provided with a non-absorbing material, and the size of the non-absorbing material, that is, a vertical distance d between a front end of the microwave heating probe and the extrusion nozzle is determined according to the microwave reflection loss R(dB) of a material to be printed, based on the following formulas:

$$R(dB) = -20 \left| \frac{z_{in} - 1}{z_{in} + 1} \right|, \text{ and}$$

$$z_{in} = \sqrt{\frac{\mu_0 \mu}{\varepsilon_0 \varepsilon}} \tanh i \frac{\omega}{c} \sqrt{\varepsilon_0 \mu_0 \varepsilon \mu} d,$$

wherein when the absorption peak of a reflection loss R(dB) curve of the material is the smallest, the corresponding material thickness value is the value of d; $z_{in}$ is input impedance of the material to be printed; c is vacuum light velocity, and $c=3\times10^8$ m/s; $\omega=2\pi f$, f is microwave frequency, $\mu_0$ is magnetic conductivity in a free space with the value of $4\pi\times10^{-7}$ H/m; $\mu$ is magnetic conductivity of the material to be printed; $\varepsilon_0$ is the dielectric constant in the free space with the value of $8.854\times10^{-12}$ F/m; and $\varepsilon$ is the dielectric constant of the material;
the method comprising:
setting microwave power of the food three-dimensional printer; and
performing three-dimensional printing on the material to be printed according to a printing model.

11. The method according to claim 10, wherein the selecting the barrel with the non-absorbing material of the corresponding size according to the type of the material to be printed and mounting the barrel on the food three-dimensional printer comprises: determining the vertical distance d between a front end of the microwave heating probe and the extrusion nozzle according to the following formula:

$$R(dB) = -20 \left| \frac{z_{in} - 1}{z_{in} + 1} \right|$$

$$z_{in} = \sqrt{\frac{\mu_0 \mu}{\varepsilon_0 \varepsilon}} \tanh i \frac{\omega}{c} \sqrt{\varepsilon_0 u_0 \varepsilon \mu} d$$

wherein when an absorption peak of a reflection loss R(dB) curve of the material is the smallest, a corresponding material thickness value is a value of d; $z_{in}$ is input impedance of the material to be printed; c is vacuum light velocity, $c=3\times10^8$ m/s; $\omega=2\pi f$, f is microwave frequency; $\mu_0$ is magnetic conductivity in a free space with a value of $4\pi\times10^{-7}$ H/m; $\mu$ is magnetic conductivity of the material to be printed; $\varepsilon_0$ is a dielectric constant in the free space with a value of $8.85\times10^{-12}$ F/m; and $\varepsilon$ is a dielectric constant of the material to be printed.

12. The method according to claim 10, wherein the food comprises flowing gelatinous food.

13. The printer according to claim 1, further comprising an X-axis guide rod, a Z-axis guide rod, a Y-axis guide rod, a printing platform, a barrel, a lead screw stepping motor and a fixed seat.

* * * * *